July 1, 1947.　　　W. C. WILLIAMS　　　2,423,164
FIXTURE
Filed Feb. 22, 1944

INVENTOR.
WILLIAM C. WILLIAMS,
BY
ATTORNEY.

Patented July 1, 1947

2,423,164

UNITED STATES PATENT OFFICE 2,423,164

FIXTURE

William C. Williams, Santa Monica, Calif.

Application February 22, 1944, Serial No. 523,414

4 Claims. (Cl. 77—62)

1

My invention relates to a fixture or jig and has particular reference to an adjustable fixture by means of which holes may be accurately drilled in a workpiece or other machining operations performed thereon at substantially any desired angle to the principal planes thereof.

This application is a continuation-in-part application of my copending application Serial No. 444,537, filed May 26, 1942, now abandoned, and entitled "Drill jig."

In certain manufacturing industries such as, for example, the aircraft manufacturing industry, certain of the fabricating or assembling operations require that one or more holes be drilled through or into a workpiece at certain angles to the surface of the workpiece other than perpendicular thereto and with the normal plane including the axis of such inclined hole extended in a particular direction with respect to the shape or form of the workpiece. This is particularly true in the aircraft industry where the holes employed to receive the rivets, bolts or other attaching means in the framework of the plane or in the skin sheets attached to the framework need to be disposed at odd angles in order to permit the rivet, bolt or the like to be passed through the hole.

The drilling of such holes presents a considerable problem particularly where it is desired to incorporate the drilling operation into a mass production schedule. It is the present practice to provide for the proper location and angular disposition of these holes by using a fixed drill axis and mounting the workpiece upon an adjustable table, the ordinary drill press with an adjustable table representing a typical example of the mechanism used to drill such inclined holes.

This mode of drilling the holes has certain disadvantages, not the least of which resides in the fact that the workpieces must be placed on the table before the hole can be drilled and must be removed from the table before a similar operation can be performed upon another piece. This entails a great deal of effort and a considerable loss of time where the workpieces comprise large sheets or prefabricated structures of considerable size. There is encountered, furthermore, the difficulty of positioning such large sheets or pieces of mechanism on the supporting table of the drill press with sufficient accuracy to insure the proper location of the hole in such workpiece.

In certain industries and particularly in the aircraft industry the present practice is to use,

2 in preference to the drill press mentioned in the preceding paragraph, fixed drill guide jigs which are adapted to be temporarily secured or clamped to the workpiece in the desired location so that a hand supported drill usually electrically or air driven may be employed for drilling the hole, the jig including a drill guide which serves to permit the operator of the drill to hold the drill in the desired angular position.

While these jigs operate satisfactorily as to the drilling of a particular hole, it is obvious that a separate jig of this type is required for each different size of hole to be drilled or for each different angle of inclination of the hole. Furthermore, if for any reason the plans and specifications are so changed as to call for a different size of hole or a different angle of inclination of the hole, the fixed type of drill jig must be discarded and a new one constructed to take its place.

It is an object of my invention to provide a fixture of the character set forth in the preceding paragraphs which includes a novel locking mechanism for holding the parts immovable in any adjusted position in which they may be placed.

It is a still further object of my invention to provide a drill guide which includes an adjustable means for readily and accurately positioning a drill guide of substantially any selected size at substantially any desired angle relative to the origin of pre-established reference axes of a workpiece.

It is also an object of my invention to provide a drill guide of the character set forth in the preceding paragraph which provides a means for readily and accurately positioning the axis of the drill guide at any desired angular inclination from the normal to the surface of the workpiece.

It is an additional object of my invention to provide a drill guide of the character set forth in the preceding paragraphs which includes a means for accurately disposing the normal plane including the drill guide axis at any desired angle to the reference axes of the workpiece.

Other objects and advantages of my invention will be apparent from a study of the following specifications, read in connection with the accompanying drawings, wherein.

Figure 1:
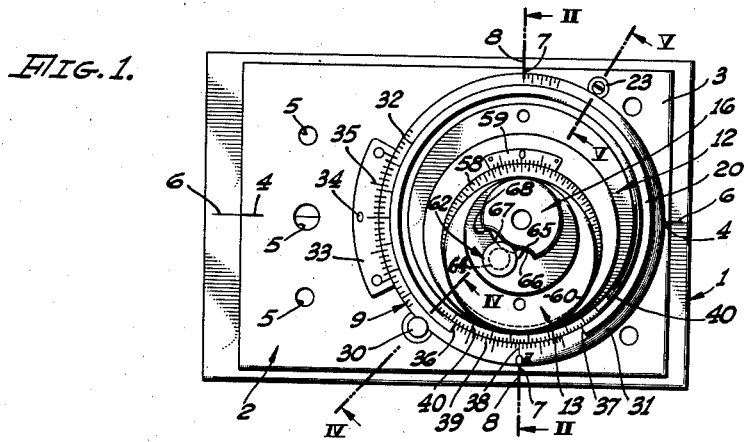
Fig. 1 is a top plan view of a fixture or drill jig constructed in accordance with one embodiment of my invention and intended particularly for use in guiding drills employed to drill holes at an angle inclined from the normal to the workpiece in which such hole is to be drilled.
Figure 4:
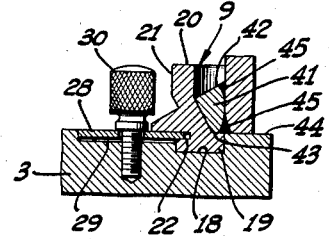
Figure 5:
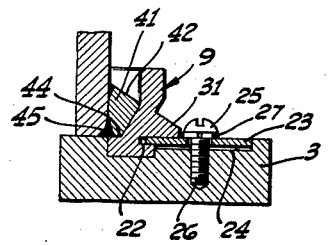

Fig. 4 is a fragmentary sectional view taken substantially along the line IV—IV of Fig. 1 and illustrating the details of construction of a locking mechanism employed to lock one of the protractor setting rings employed on the device; and Fig. 5 is a fragmentary sectional view taken substantially along the line V—V of Fig. 1 and illustrating the details of construction of a friction device employed to produce a predetermined amount of frictional resistance to rotation of one of the protractor members.

Referring to the drawings, I have illustrated in Fig. 1 one phase of my invention as embodied in an adjustable drill guide intended to be employed for the purpose of guiding drills to be used for the drilling of holes through a workpiece when those holes are inclined from a normal to the surface of such workpiece.

In Fig. 1 the workpiece is indicated generally by the reference character 1 and the adjustable drill guide device is indicated generally by the reference character 2. This device comprises a rectangular base member 3 including longitudinal index lines 4 and/or index holes 5 by means of which the device may be longitudinally aligned with a longitudinal reference line 6 inscribed or otherwise suitably marked on the workpiece 1 and representing one of the axes of the hole which is to be drilled in the workpiece 1. Similarly, the base member 3 may include transversely extending index lines or marks 7 permitting the device as a whole to be aligned with transversely extending reference lines 8 also inscribed on the workpiece 1 and employed to define the other axis of the hole to be drilled in the workpiece.

Generally speaking, the device of my invention includes, in addition to the base member 3, an outer adjustable protractor ring 9 concentrically positioned with respect to a vertical line or axis 10 which is positioned normally with respect to an undersurface 11 of the base member 3 and passes through the intersection of the index lines 4 and 7. Within the protractor ring 9 there is mounted an outer rotatable member 12, this member being concentrically positioned with respect to the axis 10 and supported for rotation thereabout by the base member 3.

Figure 2:
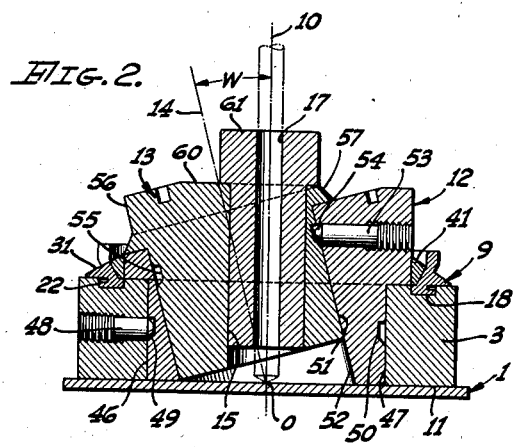
Fig. 2 is a cross sectional view taken substantially along the line II—II of Fig. 1 and illustrating the relative positions of the parts of the device illustrated in Fig. 1 when that device is adjusted to provide for the drilling of a hole in a direction normal to the surface of a workpiece upon which the device is placed.

The outer member 12 in turn rotatably supports an inner rotatable member 13, this latter member being supported for rotation about an axis 14 which is inclined at an angle $w$ to the axis 10, the axis 14 being so positioned as to intersect the axis 10 at the point of intersection of the axis 10 with the undersurface 11 of the base member 3, such point of intersection being indicated in Fig. 2 by the reference character 0.

The inner rotatable member 13 is in turn bored as at 15 to receive any one of a plurality of drill guide members 16, each of such members 16 being identical with the others except for the diameter of the drill guiding aperture 17 which is defined by the drill guide 16, the guiding aperture 17 of each of the members 16 corresponding to the different sizes of drills with which the guide is to be used.

The axis of the drill guide receiving bore 15 is inclined from the axis 14 of the member 13, this latter angle of inclination being also preferably equal to the angle of inclination $w$ of the axis 14 with respect to the axis 10 and like the axis 14 also intersects the axis 10 and the axis 14 at the intersection 0 of these axes with the undersurface of the base member 3.

The protractor ring 9 may be rotatably supported upon the base member 3 as by providing in the base member an annular upwardly facing groove 18 which is formed in the upper surface of the base member 3. The ring 9 may include a lower guiding portion 19 (see Fig. 4) contoured to conform to the configuration of the annular groove 18 so as to be received within said annular groove and guided thereby for rotation about the axis 10. The member 9 also preferably includes an upwardly extending flange-like portion 20 defining an outer surface 21 which may be knurled or otherwise adapted for grasping with the fingers to permit the member 9 to be turned to any desired angular position about the axis 10.

I have found it desirable to impose a certain amount of frictional resistance to the turning of the member 9 as this appears to aid in the accurate setting of this member to a desired angular position. Accordingly, the outer periphery of the guiding portion 19 is provided with a circumferentially extending groove 22 dimensioned to loosely receive the edge of a clamping washer 23, which washer is in turn positioned in a suitably contoured recess 24 formed in the upper surface of the base member 3. The recess 24 is preferably formed with a depth such as to position the bottom of the recess somewhat below the lowermost surface of the slot 22. An adjusting screw 25 is threaded into a suitably threaded bore 26 formed in the base member 3, the screw 25 being passed through a suitable aperture formed in the clamping washer 23.

A spring member 27 comprising preferably a conventional type of spring lock washer is interposed between the head of the screw 25 and the upper surface of the clamping washer 23. By this means an adjustable downwardly directed spring pressure may be exerted on the clamping washer 23 so as to force the portion 19 of the protractor member 9 into pressure engagement with the bottom of the recess 18 within which that portion is received to thus impose an adjustable frictional resistance to the turning of the member 9.

As is clearly shown in Fig. 4, I provide a similarly constructed mechanism for locking the member 9 against further movement after it has once been rotated to the desired adjusted position. This locking mechanism may include a locking plate or washer 28 received in a suitable recess 29 formed in the upper surface of the base member 3 and so positioned as to extend the edge of the washer 28 into the locking groove or channel 22 which is formed in the member 9. A thumb screw 30 is threadedly engaged with the base member 3 and passed through a suitable aperture formed in the locking plate 28 so that by merely tightening the locking screw 30 with the fingers, sufficient pressure may be exerted on the member 9 to securely lock the same against rotation.

The member 9 preferably also includes an inclined or sloping upper surface 31 which is graduated as is indicated at 32 in Fig. 1, these graduations preferably being in terms of degrees so that the angular position of the outer protractor member 9 with respect to the index lines 4 and 7 may be ascertained by having reference to an index plate 33 (see Fig. 1) which includes an index 34 aligned with the longitudinal index lines 4. The index plate 33 may also include vernier type graduations 35 to provide additional accuracy in the reading and in the setting of the angular position of the member 9.

The aforementioned upwardly extending flange portion 20 of the member 9 is preferably cut away for a portion of its circumference to terminate at points identified by reference characters 36 and 37 in Fig. 1. Between these two points there is inscribed along the upper edge of the sloping surface 31 a second index 38 and vernier calibrations 39 to coact with a suitable angular calibration 40 inscribed on a protractor ring 41 secured to the periphery of the outer rotatable member 12.

The index 38 is preferably positioned in coincidence with the 90° mark of the protractor ring 32 so that the angle indicated by the index 34 and the calibration 32 represents the angular position of the index 38 with respect to the transverse lines 7. Thus the member 9 constitutes an adjustable index plate by means of which the index 38 for the protractor scale 40 may be moved to any desired angular position with respect to the transverse index lines 7.

Attention is directed to the contour of the inner surface of the member 9 which provides an annular space for receiving the protractor ring 41. This protractor ring includes a sloping upper surface 42 upon which the protractor scale 40 is inscribed and includes also a horizontally positioned undersurface 43 which overlies a horizontal upper surface 44 defined by the guiding portion 19 of the protractor ring member 9 so that the protractor ring 41 serves to confine the portion 19 within its guiding annular recess 18. The protractor ring 41 may, if desired, be formed integrally with the member 12 but is preferably formed as a separate piece secured to the member 12 in a suitable manner as, for example, by means of welding 45.

Reference has hereinbefore been made to the fact that the outer rotatable member 12 is supported by the base member 3 for rotation about the vertical axis 10. This supporting of the member 12 is accomplished by forming the member 12 with a downwardly extending cylindrical bearing portion 46 which is closely received within a suitably sized aperture 47 extended through the base member 3 and disposed concentrically relative to the axis 10.

Means is preferably provided for locking the outer rotatable member 12 in any position in which it may be placed. Such a locking means may comprise, as is illustrated in Fig. 2, a locking screw 48 threadedly engaged with the base member 3 and positioned in such location as to engage a conical point 49 formed thereon with a suitably contoured and suitably positioned annular recess 50 formed in the periphery of the cylindrical portion 46 of the member 12.

A similar arrangement is employed for rotatably supporting the inner rotatable member 13 on the outer member 12, the inner member including a cylindrical portion 51 which is closely received within a suitably sized aperture 52 extended through the member 12, the aperture 52 being concentric with and aligned with the aforementioned axis 14. A locking arrangement similar to that previously described for the member 12 may also be employed for the member 13, this latter locking arrangement comprising a locking screw 53 threadedly engaged with the member 12 in a position to dispose the conical end 54 of the screw 53 in a suitably contoured and suitably positioned annular recess 55 extended circumferentially about the cylindrical portion 51.

The inner member 13 includes a head portion 56 which is in turn formed with a sloping skirt-like portion 57. The sloping surface 57 is preferably calibrated in degrees as is indicated at 58 in Fig. 1, these calibrations being intended to coact with a suitable vernier type index plate 59 secured to the upper surface of the outer rotatable member 12. The head portion 56 of the inner member 13 defines also a plane upper surface 60 which is disposed normal to the axis of the drill guide receiving aperture 15 so that the enlarged head portion 61 of the drill guide 16 may be seated on the surface 60.

Each of the drill guides 16 is preferably removably secured to the inner member 13 when placed in operative position therein so as to prevent upward movement of the member 16 during the time the drill is being used and also prevent rotation of the drill guide member 16 within the drill guide receiving bore 15 as a result of the frictional engagement of the rotating drill with the drill guiding aperture 17. Accordingly, I provide a shoulder screw 62 which includes a threaded shank portion screwed into the upper plane surface 60 of the inner member 13 and which includes also a cylindrical shoulder portion 64 having a diameter somewhat exceeding the diameter of the shank portion and including also a head portion 65 of cylindrical form having a diameter somewhat exceeding the diameter of the shoulder 64. The side surface of the head portion 61 of the drill guide 16 is preferably cut away as is illustrated in Fig. 1 to form a partially cylindrical axially extending groove 66 to receive the head 65 and permit the drill guide 16 to be moved longitudinally in the bore 15 past the screw 62.

The cut away portion of the head 61 serves also to define a radially extending flange 67 adapted to pass beneath the head 65 so that by inserting the drill guide in the bore 15 to permit the screw head 65 to pass along the channel 66 and by then turning the drill guide 16, the flange 67 may be caused to pass under the head 65 and prevent upward movement of the guide. The cut away portion of the drill guide terminates in a shoulder 68 adapted to bear against the head 65 and prevent rotation of the drill guide.

Figure 3:
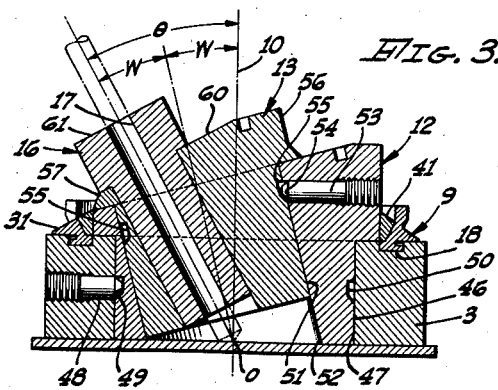
Fig. 3 is a cross sectional view similar to Fig. 2 but illustrating the relative positions of the parts of the device when those parts are adjusted to incline the axis of the drill guide from the normal to the surface of the workpiece.

Fig. 3 illustrates the same structure as is illustrated in Fig. 2 but shows the parts turned to extend the axis of the drill guiding aperture 17 at an angle $\theta$ to the vertical axis 10, Fig. 3 illustrating the special case where the parts are in such position as to make $$\theta = 2w$$

which is the maximum amount of inclination which may be imparted to the axis of the drill guiding aperture 17.

It will be noted that the magnitude of the angle

θ is controlled by the angular position of the inner member 13 with respect to the outer member 12. It will be further noted that the angular position of the outer rotatable member 12 controls or determines the angular relation between the longitudinal index lines 4 and the vertical plane defined by the vertical axis 10 and the sloping axis of the drill guiding aperture 17. The relation between these angles may be expressed as follows:

$$\phi = 2 \sin^{-1} \frac{\sin \frac{\theta}{2}}{\sin w} \quad (1)$$

where θ represents the vertical angle of inclination of the axis of the drill guiding aperture 17 with respect to the vertical axis 10, φ represents the angle as indicated by the calibration 57 and index plate 59 through which the inner member 13 is rotated from the initial position which is illustrated in Fig. 2, and w represents the angle of inclination of the axis 14 with respect to the axis 10 and also the angle of inclination of the axis of the drill guiding aperture 17 with respect to the axis 14.

Similarly, the horizontal angle through which the outer rotatable part 12 must be moved from the initial position illustrated in Figs. 1 and 2 to produce coincidence between the index lines 4 and the vertical plane defined by the sloping axis of the drill guiding aperture 17 and the vertical axis 10 is represented by $$a = \tan^{-1} \left[ \frac{(\sin^2 w - \sin^2 \frac{\theta}{2})^{\frac{1}{2}}}{\cos w \sin \frac{\theta}{2}} \right] \quad (2)$$

where θ and the w are as above defined and a represents the angle through which the member 12 is to be rotated from the initial position illustrated in Fig. 1.

In the event it is desired to position the vertical plane which includes the inclined axis of the drill guiding aperture 17 at some angular position other than in coincidence with the index lines 4, it is merely necessary to first set the outer protractor ring to a position indicating on the index 34 the desired angular location of the aforementioned vertical plane. The protractor ring 9 may then be locked in such position by means of the locking screw 30, whereupon the outer member 12 is turned to indicate, by means of the protractor scale 40 on the index 38, the determined value of the angle a and the outer member is then locked in such adjusted position by means of the locking screw 48. The inner member 13 is then rotated to a position in which the protractor scale 58 indicates on the index plane 59 the determined value of the angle φ, whereupon the inner member is locked in such position by means of the locking screw 53. This operation serves to position the axis of the drill guiding aperture 17 at the desired angle of inclination with respect to the vertical axis 10 and serves also to extend the vertical plane which includes the axis of the drill guiding aperture 17 in the desired direction with respect to the index lines 4.

It will be understood, of course, that in order for the hole which may be drilled by using the drill guide thus positioned to pass through the desired location represented by the intersection of the axes 6 and 8, it is necessary that the base member 3 be positioned as illustrated in Fig. 1 with the index lines 4 coinciding with the marks 6 and with the index lines 7 coinciding with the marks 8. Under ordinary circumstances the base plate 3 will be secured to the workpiece 1 in such position as by means of a suitable hold-down clamp or other securing device.

The mode of operation of the mechanism may be perhaps more clearly illustrated by considering certain specific examples:

*Example #1*

Assume that it is desired to drill a hole through the workpiece 1 at an angle of 20° from the vertical and that the vertical plane which includes the axis of the hole be extended at an angle of 45° measured in a counterclockwise direction to the index lines 4. Assume further that the device is so constructed that the angle w is equal to 15°. This setting of the device may be accomplished by first turning the protractor ring 9 to a position such that the desired angle of 45° is indicated by the scale 32 at the index 34. The protractor ring 9 is then locked in this position by means of the thumb screw 30.

By means of Equation 2, the angle a for θ=20° and w=15° is found to be equal to 48° 50'. The outer member 12 is then rotated to a position such that the angle 48° 50' is indicated on the scale 40 opposite the index 38, whereupon the outer member 12 is locked in such position by means of the locking screw 48. Thereafter by means of Equation 1 the angle φ corresponding to θ=20°, w=15° is ascertained to be 84° 17'. The inner member 13 is then rotated to a position in which the ascertained angle of 84° 17' is indicated by the calibrations 58 opposite the index 59 and the inner member is locked in this position by means of the locking screw 53.

Having made these adjustments to the members 9, 12 and 13 the angle of the drill guiding aperture 17 is positioned at an inclination of 20° from the vertical axis 10 and the vertical plane including the drill guiding axis is positioned at an angle of 45° with respect to the longitudinal index lines 4.

*Example #2*

Assume that it is desired to so adjust the device that the hole controlled by the drill guide 16 will be inclined from the vertical at an angle of 5° and that the direction of this inclination will be at right angles to longitudinal index lines 4. Assume also, as in Example #1, that the angle w is equal to 15°. The outer protractor ring 9 is turned to a position indicating the desired right angle relationship by a 90° reading on the scale 32 opposite the index 34 and the thumb screw 30 is employed to lock the protractor ring 9 in that position.

From Equation 2 above the angle a corresponding to θ=5°, w=15° is ascertained to be 80° 37'. The outer rotatable member 12 is turned to a position such that the ascertained angle of 80° 37' is indicated by the scale 40 on the index 38 and the locking screw 48 is employed to secure the outer member 12 in that position. From Equation 1 above the angle φ corresponding to θ=5°, w=15° is found to be 19° 24'. The inner rotatable member 13 is turned to a position such that the ascertained angle of 19° 24' is indicated by the scale 58 opposite the index 59 and the inner member 13 is locked in that position by the screw 53. This operation serves to dispose the axis of the drill guiding bore 17 in a position corresponding to the above noted assumed desired position.

From the foregoing, it will be observed that I have provided a novel fixture which, as described by the presently preferred embodiment of my invention, may be used to position a drill guide so that the axis of the hole drilled and guided by the device may be positioned as desired, extended at any desired inclination relative to the vertical and inclined at any desired direction relative to reference lines marked on the workpiece and identifying the desired surface location of the hole.

Attention is further directed to the fact that with respect to the form of the invention just described, it is important that the parts be so arranged that the axes 10, 14 and the axis of the drill guiding aperture 17 all intersect each other at the point 0 positioned in the plane defined by the under surface 11 of the base member 3. By so arranging the axes, the possibility of the hole location being shifted by making adjustments to the amount or direction of the inclination of the hole is avoided.

While I have shown and described the preferred embodiment of my invention, I do not desire to be limited to any of the details of construction shown or described herein, except as defined in the appended claims.

I claim:

1. In a fixture, the combination of: a base member having an undersurface adapted to be placed in contact with a workpiece; an outer member mounted for rotation on said base member about an axis intersecting said undersurface, said outer member having a hole extending therethrough at an angle to said axis of rotation such that the axis of said hole intersects said axis of rotation at the point of intersection of said axis of rotation with said undersurface; an inner member mounted for rotation in said hole, said inner member having an aperture extended therethrough; and a tool guiding member mounted in said aperture and defining a guiding line disposed at an angle to said axis of rotation such that said guiding line intersects both of said axes at said point of intersection of said axes with said undersurface.

2. In a fixture, the combination of: a base member having an undersurface adapted to be placed in contact with a workpiece; means on said base member defining a pair of vertical index planes intersecting each other to define a reference point on said undersurface; an outer member mounted for rotation on said base member about one axis passing through said reference point; an inner member mounted on said outer member for rotation about another axis disposed at an angle to said one axis and passing through said reference point; and a tool guiding member mounted on said inner member and defining a guiding line disposed at an angle to said other axis of rotation and passing through said reference point.

3. In a fixture, the combination of: a base member having an undersurface adapted to be placed in contact with a workpiece; means on said base member defining a pair of vertical index planes intersecting each other to define a reference point on said undersurface; an outer member mounted for rotation on said base member about one axis passing through said reference point and disposed at right angles to said undersurface; an inner member mounted on said outer member for rotation about another axis disposed at an acute angle to said one axis and passing through said reference point, said inner member having a drill guide receiving bore formed therein in such location that the axis of a selected drill guide placed in said bore extends at an acute angle to said other axis of rotation and passes through said reference point.

4. In a fixture, the combination of: a base member; a protractor ring mounted for rotation on said base member; means on said base member defining an index cooperating with said protractor ring; an outer member mounted for rotation on said base member concentrically with said protractor ring, said outer member having protractor graduations inscribed on its outer periphery; another index means carried by said protractor ring in a position to cooperate with said graduations on said outer member; an inner member mounted on said outer member for rotation about an axis disposed at an angle to the axis of rotation of said outer member; protractor means associated with said inner member and with said outer member for measuring the angular position of said inner member relative to said outer member; and a tool guiding member mounted on said inner member and defining a guiding line disposed at an angle to the axis of rotation of said inner member.

WILLIAM C. WILLIAMS.

REFERENCES CITED

The following references are of record in the file of this patent:

UNITED STATES PATENTS

| Number | Name | Date |
|---|---|---|
| 1,092,867 | Sellew | Apr. 14, 1914 |
| 512,545 | Gilman | Jan. 9, 1894 |
| 809,432 | Darrschmidt | Jan. 9, 1906 |

FOREIGN PATENTS

| Number | Country | Date |
|---|---|---|
| 65,176 | Switzerland | July 31, 1913 |